(12) United States Patent
Masuko et al.

(10) Patent No.: US 10,692,133 B2
(45) Date of Patent: Jun. 23, 2020

(54) COLOR ESTIMATION DEVICE, COLOR ESTIMATION METHOD, AND COLOR ESTIMATION PROGRAM

(71) Applicant: Rakuten, Inc., Tokyo (JP)

(72) Inventors: Soh Masuko, Tokyo (JP); Yoichi Yoshimoto, Tokyo (JP)

(73) Assignee: Rakuten, Inc., Tokyo (JP)

( * ) Notice: Subject to any disclaimer, the term of this patent is extended or adjusted under 35 U.S.C. 154(b) by 771 days.

(21) Appl. No.: 15/022,243

(22) PCT Filed: Mar. 28, 2014

(86) PCT No.: PCT/JP2014/059303
§ 371 (c)(1),
(2) Date: Mar. 16, 2016

(87) PCT Pub. No.: WO2015/145766
PCT Pub. Date: Oct. 1, 2015

(65) Prior Publication Data
US 2016/0232601 A1 Aug. 11, 2016

(51) Int. Cl.
*G06Q 30/06* (2012.01)
*G06F 16/583* (2019.01)
(Continued)

(52) U.S. Cl.
CPC ..... *G06Q 30/0643* (2013.01); *G06F 16/5838* (2019.01); *G06K 9/4652* (2013.01); *G06K 9/6217* (2013.01)

(58) Field of Classification Search
CPC .............. G06F 16/5838; G06F 16/532; G06F 16/5866; G06F 16/24578; G06F 16/583;
(Continued)

(56) References Cited

U.S. PATENT DOCUMENTS 8,891,860 B2 * 11/2014 Masuko .................. G06T 1/00
382/162
9,330,340 B1 * 5/2016 Diverdi ................ G06T 7/0002
(Continued)

FOREIGN PATENT DOCUMENTS

JP        2011520203 A      7/2011

OTHER PUBLICATIONS

Zhu et al., "Deep into Color Names: Matching Color Descriptions by Their Fuzzy Semantics" p. 138 Artificial Intelligence: Methodology, Systems, and Applications 12th International Conference, AIMSA 2006 Varna, Bulgaria, Sep. 12-15, 2006 https://link.springer.com/chapter/10.1007/11861461_16 (Year: 2006).*
(Continued)

*Primary Examiner* — Marissa Thein
*Assistant Examiner* — Lance Y Cai
(74) *Attorney, Agent, or Firm* — Sughrue Mion, PLLC

(57) ABSTRACT

A color estimation device includes an extraction means to extract, from product information associated with a product image showing a product and containing text information about the product to be presented to a user, a plurality of color text information indicating color names as candidate color names for the product, an estimation means to estimate a color of a product shown in the product image based on a pixel value set on the basis of each of the candidate color names and a pixel value of a pixel included in the product image, and an output means to output the color estimated by the estimation means.

13 Claims, 18 Drawing Sheets

(51) Int. Cl.
   *G06K 9/46* (2006.01)
   *G06K 9/62* (2006.01)
(58) Field of Classification Search
   CPC .. G06F 3/0481; G06F 16/248; G06F 16/5846;
       G06F 16/5854; G06F 16/785; G06F
       16/50; G06K 9/4652; G06K 9/6215;
       G06K 9/4604; G06K 9/4642; G06K
       9/4647; G06K 9/00147; G06Q 30/0643;
       G06Q 30/0631; G06Q 30/0601; G06Q
       30/0627; G06Q 30/0629; G06Q 30/0623
   See application file for complete search history.

(56) References Cited

U.S. PATENT DOCUMENTS

| | | |
|---|---|---|
| 2009/0281925 A1 | 11/2009 | Winter et al. |
| 2012/0045121 A1* | 2/2012 | Youngman ......... G06Q 30/0601 382/162 |
| 2013/0300761 A1* | 11/2013 | Ahmed ................ G01J 3/463 345/595 |
| 2014/0052584 A1* | 2/2014 | Gershon ............ G06Q 30/0627 705/26.63 |

OTHER PUBLICATIONS

International Search Report dated May 13, 2014 in corresponding International Application PCT/JP2014/059303.
Yasuhiko Watanabe et. al., "Image Analysis Using Natural Language Information Extracted from Explanation Text", Journal of Japanese Society for Artificial Intelligence, vol. 13, No. 1, Jan. 1998, p. 66-p. 74 (12 pgs. total).

* cited by examiner

Fig. 3

| PRODUCT ID | PRODUCT INFORMATION/(DESCRIPTION) | PRODUCT IMAGE |
|---|---|---|
| M1 | T1 (Available colors are Red and Blue) | P1 |
| M2 | T2 (... and it comes with three colors: blue, green and white, ...) | P2 |
| M3 | T3 [◎BLUE ○RED ◎YELLOW] | P31 <REPRESENTATIVE IMAGE> |
| | | P32 |
| | | P33 |
| ... | ... | ... |

Fig. 7

| COLOR NAME | MEDIAN | | | PIXEL VALUE | | |
|---|---|---|---|---|---|---|
| | | | | COLOR RANGE | | |
| | H1M | S1M | L1M | H1L~H1H | S1L~S1H | L1L~L1H |
| RED | H2M | S2M | L2M | H2L~H2H | S2L~S2H | L2L~L2H |
| BLUE | H3M | S3M | L3M | H3L~H3H | S3L~S3H | L3L~L3H |
| YELLOW | H4M | S4M | L4M | H4L~H4H | S4L~S4H | L4L~L4H |
| GREEN | H5M | S5M | L5M | H5L~H5H | S5L~S5H | L5L~L5H |
| WHITE | H6M | S6M | L6M | H6L~H6H | S6L~S6H | L6L~L6H |
| BLACK | H7M | S7M | L7M | H7L~H7H | S7L~S7H | L7L~L7H |
| DARK BROWN | H8M | S8M | L8M | H8L~H8H | S8L~S8H | L8L~L8H |
| DARK BLUE | ... | ... | ... | ... | ... | ... |
| ... | | | | | | |

| CANDIDATE COLOR NAME | NUMBER OF PIXELS |
|---|---|
| RED | 150 |
| BLUE | 85 |

(b)

| CANDIDATE COLOR NAME | NUMBER OF PIXELS |
|---|---|
| BLUE | 180 |
| GREEN | 175 |
| WHITE | 45 |

Fig. 10

| PRODUCT ID | PRODUCT INFORMATION (DESCRIPTION) | | PRODUCT IMAGE |
|---|---|---|---|
| M1 | T1 (Available colors are Red and Blue) | | P1 <RED> |
| M2 | T2 (... and it comes with three colors: blue, green and white, ...) | | P2 <BLUE, GREEN> |
| M3 | T3 | [◎BLUE<br>○RED<br>◎YELLOW] | P31 <REPRESENTATIVE IMAGE> <BLUE><br>P32 <RED><br>P33 <YELLOW> |
| ... | ... | | ... |

| PRODUCT ID | PRODUCT INFORMATION/(DESCRIPTION) | PRODUCT IMAGE |
|---|---|---|
| M4 | T4<br><br>(You can select from three colors: dark brown, dark blue and black) | P41<br>P42<br>P43 |

(b)

| PRODUCT ID | PRODUCT INFORMATION/(DESCRIPTION) | PRODUCT IMAGE |
|---|---|---|
| M4 | T4<br><br>(You can select from three colors: dark brown, dark blue and black) | P41<DARK BROWN><br>P42<DARK BLUE><br>P43<BLACK> |

*Fig.15*

| CANDIDATE COLOR NAME | PRODUCT IMAGE | NUMBER OF PIXELS |
|---|---|---|
| NUMBER OF PIXELS | P41 | 200 |
| | P42 | 180 |
| | P43 | 175 |
| DARK BLUE | P41 | 130 |
| | P42 | 200 |
| | P43 | 140 |
| BLACK | P41 | 90 |
| | P42 | 80 |
| | P43 | 130 |

| PRODUCT ID | PRODUCT INFORMATION/(DESCRIPTION) | PRODUCT IMAGE |
|---|---|---|
| M5 | T5 | P51 |
| | (Black and dark blue are available) | P52 |

(b)

| PRODUCT ID | PRODUCT INFORMATION/(DESCRIPTION) | PRODUCT IMAGE |
|---|---|---|
| M5 | T5 | P51<BLACK> |
| | (Black and dark blue are available) | P52<BLACK> |

(c)

| PRODUCT ID | PRODUCT INFORMATION/(DESCRIPTION) | PRODUCT IMAGE |
|---|---|---|
| M5 | T5 | P51<BLACK> |
| | (Black and dark blue are available) | P52<DARK BLUE> |

| CANDIDATE COLOR NAME | NUMBER OF PIXELS |
|---|---|
| BLACK | 150 |
| DARK BLUE | 100 |

(b)

| CANDIDATE COLOR NAME | NUMBER OF PIXELS |
|---|---|
| BLACK | 140 |
| DARK BLUE | 120 |

(c)

| CANDIDATE COLOR NAME | PRODUCT IMAGE | NUMBER OF PIXELS |
|---|---|---|
| BLACK | P51 | 150 |
| | P52 | 140 |
| DARK BLUE | P51 | 100 |
| | P52 | 120 |

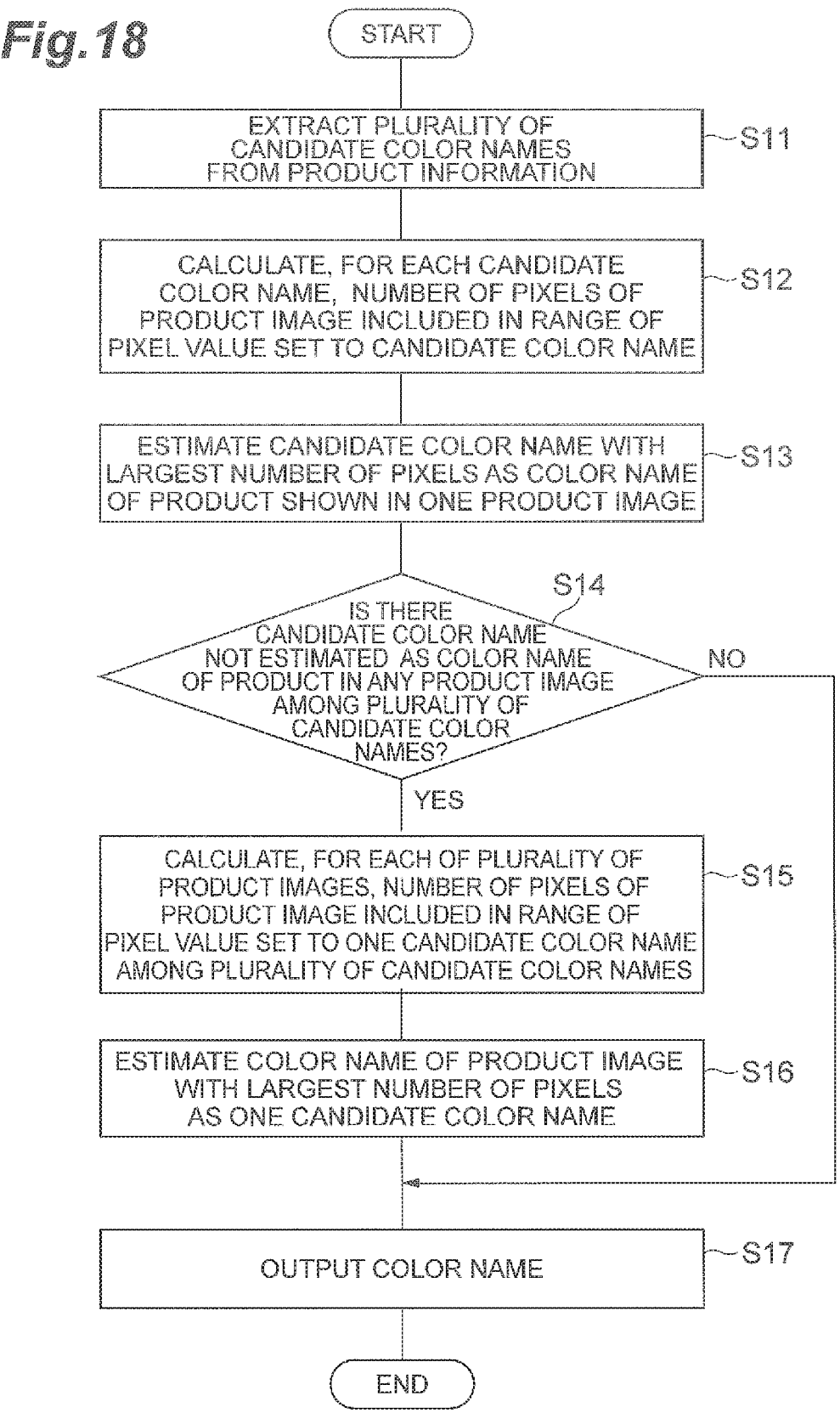

COLOR ESTIMATION DEVICE, COLOR ESTIMATION METHOD, AND COLOR ESTIMATION PROGRAM

CROSS REFERENCE TO RELATED APPLICATIONS

This application is a National Stage of International Application No. PCT/JP2014/059303 filed Mar. 28, 2014, the contents of all of which is incorporated herein by reference in its entirety.

TECHNICAL FIELD

One aspect of the present invention relates to a color estimation device, a color estimation method, and a color estimation program.

BACKGROUND ART

A technique that specifies a color with a large number of pixels contained in an image showing a product as the primary color of the product is known (see Patent Literature 1, for example).

CITATION LIST

Patent Literature

PTL 1: Japanese Unexamined Patent Publication No. 2011-520203

Summary of Invention

Technical Problem

In the above-mentioned related art, when a background region occupies a large part of a product image, for example, there is a possibility that the color of the background is incorrectly specified as the color of the product. Another possible way is, in view of the fact that a product is likely to be placed at the center of an image, to calculate the number of pixels after assigning weights to a pixel located at the center of an image; however, when a color different from the color of the product is placed at the center of the image, there is a possibility that an incorrect color name is specified.

In light of the above, an object of one aspect of the present invention is to accurately estimate the color of a product shown in a product image that contains a plurality of colors.

Solution to Problem

To solve the above problem, a color estimation device according to one embodiment of the present invention includes an extraction means configured to extract, from product information associated with a product image showing a product, a plurality of color text information indicating color names as candidate color names for the product, an estimation means configured to estimate a color of a product shown in the product image based on a pixel value set to each of the candidate color names and a pixel value of a pixel included in the product image, and an output means configured to output the color estimated by the estimation means A color estimation method according to one embodiment of the present invention is a color estimation method performed by a computer, the method including an extraction step of extracting, from product information associated with a product image showing a product, a plurality of color text information indicating color names as candidate color names for the product, an estimation step of estimating a color of a product shown in the product image based on a pixel value set to each of the candidate color names and a pixel value of a pixel included in the product image, and an output step of outputting the color estimated in the estimation step.

A color estimation program according to one embodiment of the present invention causes a computer to implement an extraction function to extract, from product information associated with a product image showing a product, a plurality of color text information indicating color names as candidate color names for the product, an estimation function to estimate a color of a product shown in the product image based on a pixel value set to each of the candidate color names and a pixel value of a pixel included in the product image, and an output function to output the color estimated by the estimation function.

According to the above aspects, candidate color names are extracted from product information containing text indicating the color of a product shown in a product image, and the color of the product is estimated based on the pixel value and the number of pixels included in the product image, and it is thus possible to prevent an incorrect color name from being estimated as the color name of the product and thereby achieve the accurate estimation of the color name.

In the color estimation device according to another aspect, the estimation means estimates the color of the product shown in the product image among the candidate color names extracted by the extraction means.

According to this aspect, because the color of the product is estimated among the candidate color names, it is possible to prevent an incorrect color name from being estimated as the color name of the product.

In the color estimation device according to another aspect, the estimation means calculates, for each of the candidate color names, the number of pixels of the product image included in a color range being a range of the pixel value set to each of the candidate color names, and estimates a candidate color name with the largest number of pixels as the color of the product shown in the product image.

According to this aspect, because the candidate color name with the largest number of pixels included, in the color range set to each of the candidate color names is estimated as the color of the product, it is possible to output the candidate color name that is most likely to indicate the color of the product as the color of the product.

In the color estimation device according to another aspect, the estimation means assigns higher weights to a second pixel located at a position closer to a center of the product image compared with a first pixel included in the product image than to the first pixel, and calculates the number of pixels for each of the candidate color names.

According to this aspect, because higher weights are assigned to pixels that are closer to the center where a color which is more appropriate as the color name of a product is likely to be located in a product image and then the number of pixels is calculated for each candidate color name, it is possible to estimate the color name more accurately.

In the color estimation device according to another aspect, the estimation means sets color ranges of the candidate color names not to overlap with each other based on the pixel value set to each of the candidate color names.

According to this aspect, because the color ranges are set to the respective candidate color names without overlap, even when a plurality of extracted candidate color names have pixel values close to each other, it is possible to appropriately calculate the number of pixels for each of the candidate color names.

In the color estimation device according to another aspect, the estimation means clusters pixels of the product image based on pixel values, and when a median value of a group is included in a color range of the candidate color name, calculates the number of pixels for each of the candidate color names, assuming the number of pixels included in the group as the number of pixels included in the color range of the candidate color name.

Because a region having a color corresponding to the color of a product occupies a certain range in a product image, according to this aspect, candidate color names are associated with each group of pixels clustered by pixel values, and thereby candidate color names are associated for each region of the same color, and the number of pixels is calculated. It is thereby possible to efficiently perform the accurate estimation of a color name.

In the color estimation device according to another aspect, the estimation means estimates a candidate color name where the calculated number of pixels is the largest and a candidate color name where a difference in the calculated number of pixels from that candidate color name is equal to or less than a specified number respectively as colors of a plurality of products shown in the product image.

According to this aspect, it is possible to estimate the color name of each product even when a plurality of products with different colors are shown in one product image.

In the color estimation device according to another aspect, when a plurality of product images are associated with one product, the estimation means estimates a color for each of the product images.

According to this aspect, in the case where plurality of product images are associated with one product, it is possible to estimate the color of the product shown in each of the product images.

In the color estimation device according to another aspect, when a plurality of product images are associated with one product, the estimation means calculates, for each of the product images, the number of pixels of the product image included in a color range being a range of the pixel value set to one candidate color name among the plurality of candidate color names, and estimates a color of the product image with the largest number of pixels to be the one candidate color name.

According to this aspect, because for one candidate color name, the number of pixels of the pixel value corresponding to that color name in each product image is calculated, and one candidate color name is estimated as the color name of the product image with the largest number of pixels, even when a plurality of extracted candidate color names have pixel values closer to each other, it is possible to accurately estimate the color name.

In the color estimation device according to another aspect, when a plurality of product images are associated with one product, the estimation means calculates, for each of the candidate color names, the number of pixels of one product image included in a color range being a range of the pixel value set to the candidate color name, and estimates a candidate color name with the largest number of pixels as the color of the product shown in the one product image, and when there is a candidate color name not estimated as the color of the product in any product image among the plurality of candidate color names, the estimation means calculates, for each of the plurality of product images, the number of pixels of the product image included in a range of the pixel value set to one candidate color name among the plurality of candidate color names, and estimates a color of the product image with the largest number of pixels to be the one candidate color name.

According to this aspect, the candidate color name with the largest number of pixels included in the color range set to each candidate color name is estimated as the color name of the product shown in one product image, and when there is a color name that is not estimated as a product color name as a result of estimating the color names of all product images, the number of pixels of the pixel value corresponding to the color name of each product image is calculated for one candidate color name, and one candidate color name is estimated as the color name of the product image with the largest number of pixels. Thus, in the case where a plurality of candidate color names are associated with a plurality of product images of one product, it is possible to accurately estimate the color name of the product even when the plurality of candidate color names have pixel values close to each other.

In the color estimation device according to another aspect, when the product information contains fields for receiving designation of a color of a product from a user, the extraction means extracts color text information of the fields as candidate color names.

According to this aspect, it is possible to appropriately extract candidate color names.

In the color estimation device according to another aspect, the output means stores an estimated color in association with a product image into a product information storage means storing the product information and the product image in association with each other.

According to this aspect, because colors are associated with product images, it becomes possible to process product images based on colors.

The color estimation device according to another aspect further includes a search means configured to refer to the product information storage means in response to a search request containing designation of a color of a product from a user, and sends a search result containing a product image with which the designated color is associated hack to the user.

According to this aspect, in response to a search request for a product image with the designation of a color from a user, it is possible to provide the product image having the designated color to the user.

In the color estimation device according to another aspect, in a case where a plurality of product images are associated with one product, and one product image among the plurality of product images is set as a representative image for showing the product in a product page to present the product in the product information storage means, when a search request containing designation of a color different from a color associated with the representative image is received from a user, the search means sends a search result containing a product image with which the designated color is associated as a representative image back to the user.

According to this aspect, in response to a search request for a product with the designation of a color from a user, even when the image with a different color name from the color name designated by the search request is preset as the representative image of the product, it is possible to provide the product image with the color designated by the search request to the user.

Advantageous Effects of Invention

According to one aspect of the present invention, it is possible to accurately estimate the color of a product shown in a product image that contains a plurality of colors.

BRIEF DESCRIPTION OF DRAWINGS

FIG. 3 is a view showing a configuration of a product information storage unit and an example of data stored therein.

FIG. 7 is a view showing a configuration of a color information storage unit and an example of data stored therein.

FIG. 9(a) is a view showing a calculation result of the number of pixels included in a color range of each of candidate color names "red" and "blue", and FIG. 9(b) is a view showing a calculation result of the number of pixels included in a color range of each of candidate color names "blue" "green" and "white".

FIG. 10 is a view showing an example of the product information storage unit in which estimated color names are stored.

FIG. 14 is a view showing an example of data stored in the product information storage unit.

FIG. 15 is a view showing an example of the number of pixels of each product image included in a color range, calculated for each of candidate color names "dark brown" "dark blue" and "back".

FIG. 16 is a view showing an example of data stored in the product information storage unit.

FIG. 17(a) is a view showing a calculation result of the number of pixels included in a color range of each of candidate color names "black" and "dark blue" for a product image P51, FIG. 17(b) is a view showing a calculation result of the number of pixels included in a color range of each of candidate color names "black" and "dark blue" for a product image P52, and FIG. 17(s) is a view showing an example of the number of pixels of each of product images P51 and P52 included in a color range, calculated for each of candidate color names "black" and "dark blue".

FIG. 18 is a flowchart showing another example of a color name estimation process by an estimation unit.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof s omitted.

Figure 1:
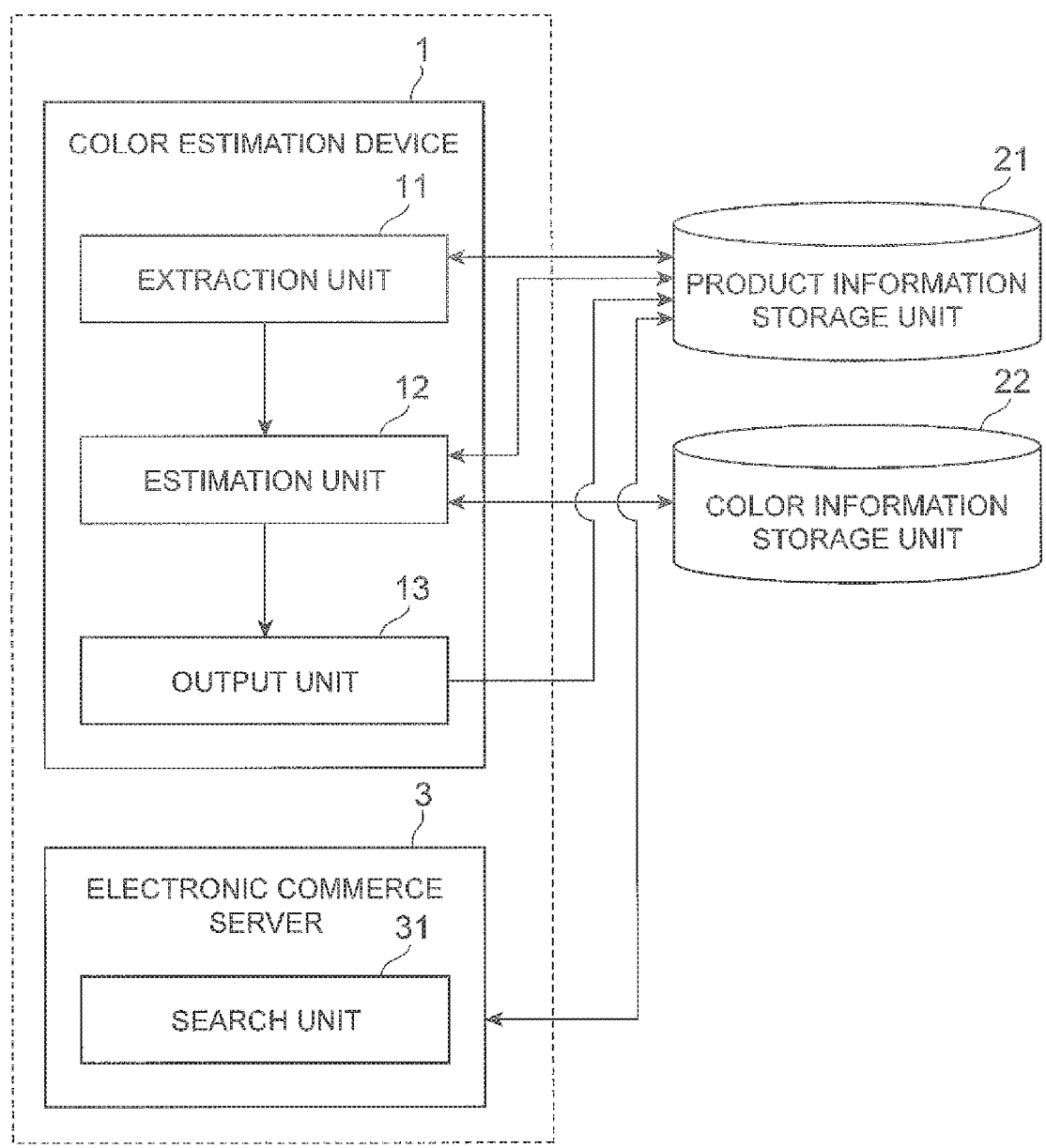
FIG. 1 is a block diagram showing a functional configuration a color estimation device 1 according to this embodiment.

FIG. 1 is a block diagram showing a functional configuration of a color estimation device 1 according to this embodiment. The color estimation device 1 according to this embodiment is a device that estimates a color name of a product shown in a product image. Although the color estimation device 1 is implemented in a server, for example, it may be integrated with an electronic commerce server 3 that runs an electronic commerce site. The electronic commerce server 3 is a server that controls commercial transactions through the Internet, and it sends a search result in response to a search request for a product from a user, for example.

As shown in FIG. 1, the color estimation device 1 according to this embodiment functionally includes an extraction unit 11 (extraction means), an estimation unit 12 (estimation means), and an output unit 13 (output means). The functional units of the color estimation device 1 can access storage means such as a product information storage unit 21 (product information storage means) and a color information storage unit 22.

Figure 2:
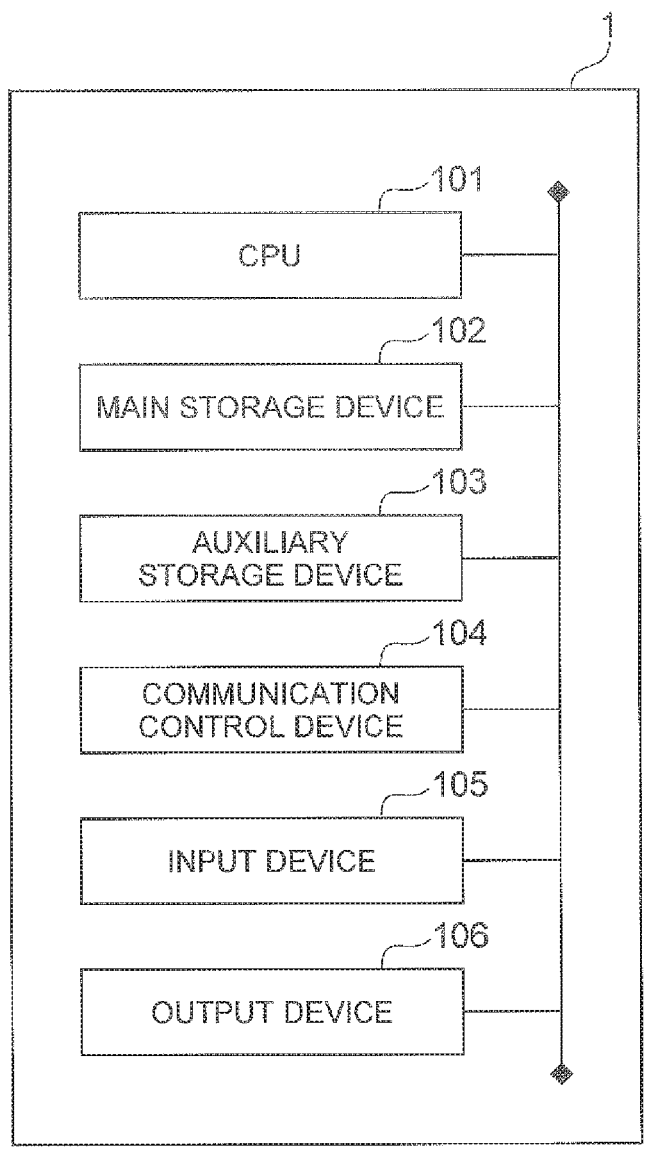
FIG. 2 is a view showing a hardware configuration of the color estimation device.

FIG. 2 is a view showing a hardware configuration of the color estimation device 1. As shown in FIG. 2, the color estimation device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 1 are implemented by loading given computer software (color estimation program) onto hardware such as the CPU 101 or the main storage device 102 shown in FIG. 2, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

The functional units of the color estimation device 1 are described hereinafter. The extraction unit 11 is a part that extracts a plurality of color text information indicating color names as candidate color names for a product from product information associated with a product image showing a product. The product information contains text information about a product to be presented to a user. The text information about a product is a description about a product, color names with fields to receive the designation of the color of a product in a product page and the like.

In this embodiment, the product information storage unit 21 stores information about products for electronic commerce, and it stores product information and product images in association with a product ID that identifies a product. FIG. 3 is a view showing a configuration of the product information storage unit 21 and an example of data stored therein. As shown in FIG. 3, the product information storage unit 21 stores product information T1 and a product image P1 in association with a product ID (M1), for example. The product information T1 contains text information "Available colors are Red and Blue" to be presented to users.

Further, the product information storage unit stores product information T2 and a product image P2 in association with a product ID (M2). The product information T2 contains text information " . . . and it comes with three colors: blue, green and white, . . . ".

Further, the product information storage unit 21 stores product information 13 and a plurality of product images P31, P32 and P33 in association with a product ID (M3). The product information T3 contains color text information "blue", "red" and "yellow" with fields for receiving the designation of the color of a product in a product page. Those fields and color text information are to be presented to users. Further, the product image P31 among the product images P31, P32 and P33 is set as a representative image when displaying the product with the product ID (M3) as a product page.

Figure 4:
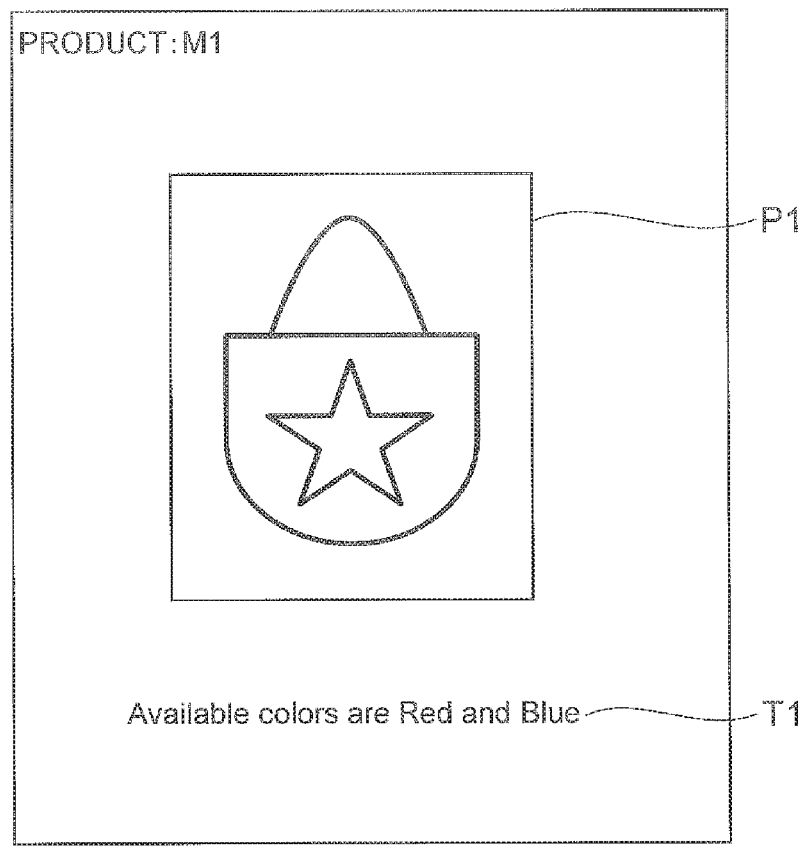
FIG. 4 is a view showing an example of a product page displayed based on information stored in the product information storage unit.

FIG. 4 is a view showing an example of the product page of the product ID (M1) that is displayed based on information stored in the product information storage unit 21. As shown in FIG. 4, the product page of the product ID (M1) contains the product image P1 showing a product and the product information T1 which is a description about the product "Available colors are Red and Blue". Thus, the product information T1 contains the color text information indicating color names "red" and "blue". This color text information is likely to correspond to the color of the product shown in the product image P1.

Figure 5:
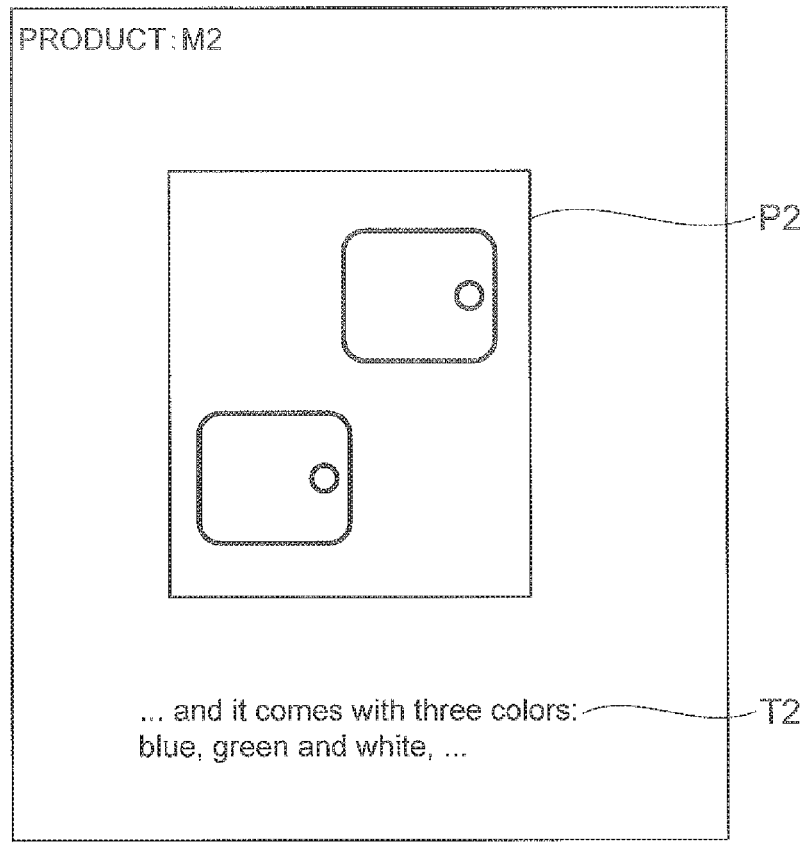
FIG. 5 is a view showing an example of a product page displayed based on information stored in the product information storage unit.

FIG. 5 is a view snowing an example of the product page of the product ID (M2) that is displayed based on information stored in the product information storage unit 21. As shown in FIG. 5, the product page of the product ID (M2) contains the product image P2 showing a product and the product information T2 which is a description about the product " . . . and it comes with three colors: blue, green and white, . . . ". Thus, the product information 12 contains the color text information indicating color names "blue", "green" and "white". This color text information is likely to correspond to the color of the product shown in the product image P2.

Figure 6:
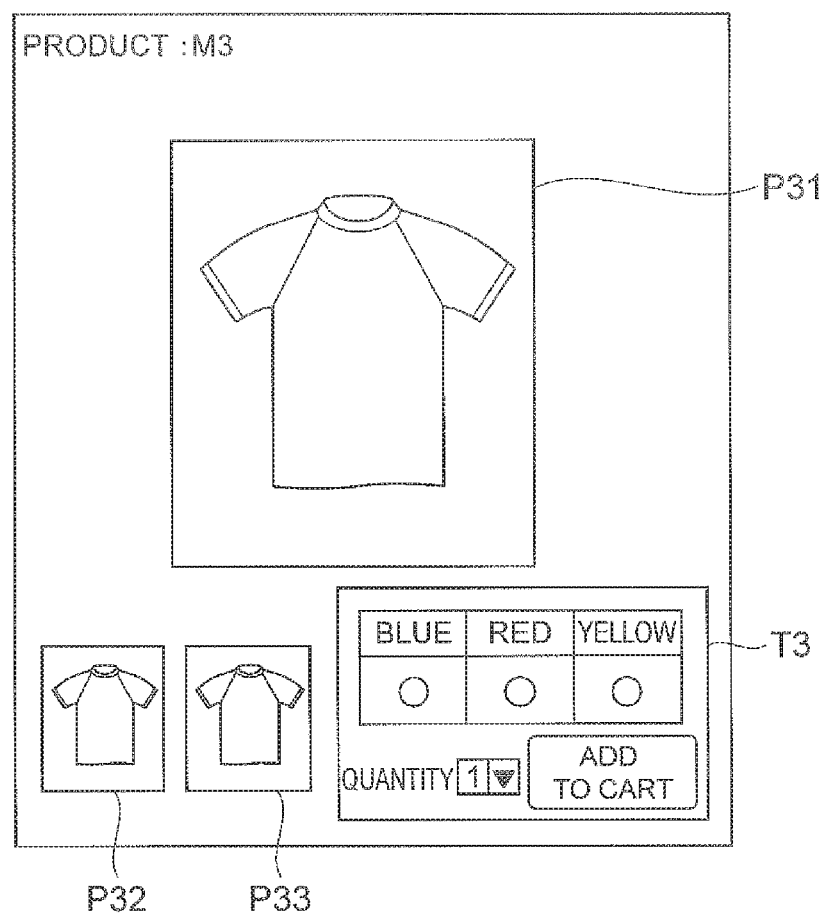
FIG. 6 is a view showing an example of a product page displayed based on information stored in the product information storage unit.

FIG. 6 is a view showing an example of the product page of the product ID (M3) that is displayed based on information stored in the product information storage unit 21. As shown in FIG. 6, the product page of the product ID (M3) contains the product image P31 that is set as a representative image. Further, among the product images stored in the product information storage unit 21, the product images P32 and P33 other than the representative image may be displayed in the format of thumbnails. This product page further contains the product information T3 including a plurality of fields for receiving the designation of the color of a product and the color text information "blue", "red" and "yellow" corresponding to the respective fields. Thus, the color of the product shown in the product image P31 is likely to be any of "blue", "red" and "yellow".

The extraction unit 11 extracts, from the product information shown in FIGS. 3, 4, 5 and 6, the color text information as candidate color or names for the product. For example, the extraction unit 11 may extract the color text information by referring to the color names in the color information storage unit 22, which is described later, as a dictionary. To be specific, the extraction unit 11 extracts the color text information "red" and "blue" from the product information T1 as candidate color names for the product with the product ID (M1). Further, the extraction unit 11 extracts the color text information "blue", "green" and white from the product information T2 including a plurality of fields for receiving the designation of the color of a product as candidate color names for the product with the product ID (M2). Further, the extraction unit. 11 extracts the color text information "blue", "red" and "yellow" from the product information T3 as candidate color names for the product with the product ID (M3).

Note that the color text information extracted from product information can include variations, such as "Kuro" and "black", for example, in the color name indicating the same color, in such a case, the extraction unit 11 may standardize the extracted color text information before setting them as candidate color names. Specifically when the color text information "Kuro" and "black" are extracted from the product information, the extraction unit 11 may standardize those color text information into "black" and set them as candidate color names.

The estimation unit 12 is a part that estimates the color of a product shown in a product image based on pixel values set to the candidate color names extracted by the extraction unit 11 and a pixel value of a pixel included in the product image.

In this embodiment, the estimation unit 12 estimates the color name of a product shown in a product image among the candidate color names extracted by the extraction unit 11. Specifically, the estimation unit 12 calculates, for each of the candidate color names, the number of pixels of the product image that are included in a color range, which is the range of pixel values set to the candidate color names, and estimates the candidate color name with the largest number of pixels as the color name of the product shown in the product image.

Figure 8:
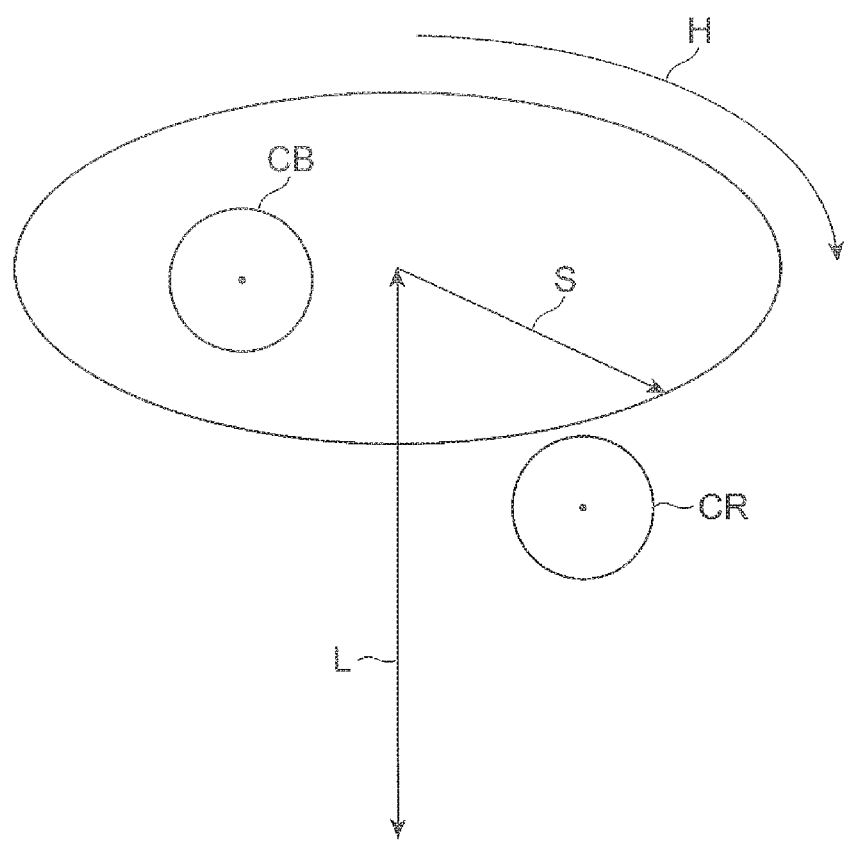
FIG. 8 is a view schematically showing an HSL color space.

In this embodiment, the estimation unit 12 acquires a color range corresponding to a candidate color name by referring to the color information storage unit 22. FIG. 8 is a view showing a configuration of the color information storage unit 22 and an example of data stored therein. The color information storage unit 22 stores a pixels value that is set for each color name. Specifically, the color information storage unit 22 stores a color range that is set for each color name. The color information storage unit 22 may further store a median value for each color name. Note that, although a pixel value is represented in the HSL color space in this embodiment, it may be represented in other parameters (for example, HSV space, RGB space etc.). For example, the color range of the color name "red" is (H1L to HIM, S1L to S1H and L1L to L1H), and a median value is (H1M, S1M and L1M).

The estimation of the color name of the product image of the product ID (M1) by the estimation unit 12 is specifically described hereinafter with reference to FIG. 8. FIG. 7 is a view schematically showing an HSL color space. The estimation unit 12 acquires the color ranges of the candidate color names "red" and "blue" extracted from the product information T1 from the color information storage unit 22. In FIG. 8, the color range of the color name "red" is indicated by the color range CR. The color range of the color name "blue" is indicated by the color range CB, The estimation unit 12 calculates the number of pixels of the product image P1 included in each of the color range CR of the candidate color name "red" and the color range CB of the candidate color name "blue". FIG. 9($a$) is a view showing a calculation result of the number of pixels included in the color range of each of the candidate color names "red" and "blue". As shown in FIG. 9($a$), among the pixels of the product image P1, the number of pixels included in the color range CR of the candidate color name "red" is 150, and the number of pixels included in the color range CB of the candidate color name "blue" is 85. Thus, the estimation unit 12 estimates the color name of the product shown in the product image P1 as "red". In this manner, the estimation unit 12 can estimate the candidate color name that is most likely to indicate the color of the product as the color name of the product.

Note that, in the calculation of the number of pixels, the estimation unit 12 may assign higher weights to a second pixel located at the position closer t the center of a product image compared with first pixel included in the product image than to the first pixel and calculate the number of pixels for each candidate color name. To be specific, the estimation unit 12 may assign weights to pixels located within a specified range including the center of a product image and calculate the number of pixels, or may assign weights to pixels in proportion to the distance from the center and calculate the number of pixels. As a result, higher weights are assigned to pixels that are closer to the center where a color which is more appropriate as the color name of a product is likely to be located in a product image and then the number of pixels is calculated for each candidate color name, which makes it possible to estimate the color name more accurately.

Further, the estimation unit 12 may refrain from calculating the number of pixels in a region other than the region in which a product is shown in a product image. A region other than the region in which a product is shown in a product image can be extracted by known image processing technology. For example, the estimation unit 12 may refrain from calculating the number of pixels in a background region.

For the product with the product ID (M2) (see FIGS. 3 and 5), the estimation unit 12 acquires the color ranges of the candidate color names "blue", "green" and "white" extracted from the product information T2 from the color information storage unit 22. Then, the estimation unit 32 calculates the number of pixels of the product image P2 included in the color range of each of the candidate color names "blue," "green" and "white". FIG. 9(b) is a view showing a calculation result of the number of pixels included in the color range of each of the candidate color names "blue", "green" and "white". As shown in FIG. 9(b), among the pixels of the product image P2, the number of pixels included in the color range of the candidate color name "blue" is 180, the number of pixels included in the color range of the candidate color name "green" is 175, and the number of pixels included in the color range of the candidate color name "white" is 45.

Then, the estimation unit 12 can estimate the candidate color name where the calculated number of pixels is the largest and the candidate color name where a difference in the number of pixels from that candidate color name is equal to or less than a specified number as the color name of each of a plurality of products shown in the product image. This is described, specifically using an example at the product with the product ID (M2), assuming that the specified number about the difference in the number of pixels for estimating a plurality of candidate color names is the color names of the plurality of products shown in the product image.

Among the candidate color names "blue", "green" and "white", the candidate color name where the number of pixels of the product image P2 included in each color range is "blue" (the number of pixels=180), and because the number of pixels included in the color range "green" is 175, which is equal to or less than 10, the estimation unit 12 estimates "blue" and "green" as the color names of the plurality of products shown in the product image P2. By such estimation, it is possible to estimate the color name of each product even when a plurality of products with different colors are shown in one product image.

For the product with the product ID (M3) (sec FIGS. 3 and 6), the estimation unit 12 acquires the color ranges of the candidate color names "blue", "red" and "yellow" extracted from the product information 13 from the color information storage unit 22. In the case where a plurality of product images are associated with one product, the estimation unit 12 estimates a color name for each product image. To be specific, for the product with the product ID (M3), because a plurality of product images P31, P32 and P33 are associated with the product information T3, the estimation unit 12 calculates, for each of the product images P31, P32 and P33, the number of pixels included in the color range of each of the candidate color names "blue", "red" and "yellow" in the same manner as the estimation of a color name in the product image P1, and thereby estimates the color names of the products shown in the product images P31, P32 and P33. The description of the estimation with specific number of pixels is omitted.

Note that, although the estimation unit 12 calculates the number of pixels of a product image included in a color range for each candidate color name in the estimation of a color name described above, the estimation unit 12 may calculate, instead of the number of pixels, the proportion of the pixels included in a color range to the pixels of a product image and estimate the color name of the product shown in the product image.

Note that, although the estimation unit 12 estimates a color name of a product in a product image based on a pixel value of each candidate color name extracted from the extraction unit 11 in this embodiment, the estimation unit 12 may estimate a color that is specified as a pixel value. In other words, the estimation unit 12 may estimate a color name, which is text information, or may estimate a pixel value indicating a displayed color as the color to be estimated.

Referring back to FIG. 1, the output unit 13 is a part that outputs the color name estimated by the estimation unit 12. Specifically, the output unit 13 stores the estimated color name in association with the product image in the product information storage unit 21 that stores product information and product images in association with each other. FIG. 10 is a view showing an example of the product information storage unit 21 in which estimated color names are stored. As shown in FIG. 10, the output unit 13 stores the estimated color name "red" in association with the product image P1. Further, the output unit 13 stores the estimated color names "blue" and "green" in association with the product image P2. Furthermore, the output unit 13 stores the estimated color names "blue", "red" and "yellow" in association with the product images P31, P32 and P33, respectively. In this manner, because the color names are associated with the product images, it becomes possible to process product images based on color names. For example, it becomes possible to extract a product image by the designation of a color name.

Figure 11:
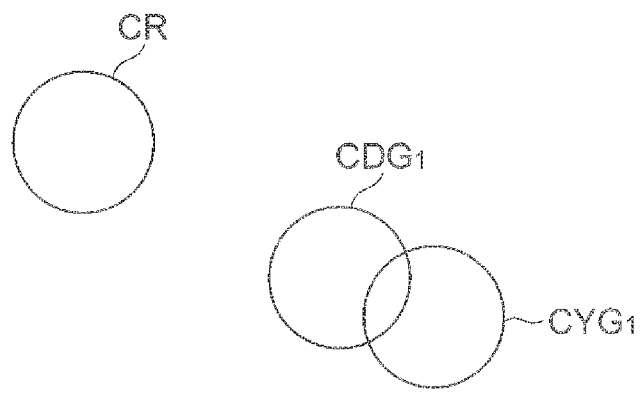
FIG. 11 is a view schematically showing color ranges of candidate color names "red" "dark green" and "yellow green" in a color space.
Figure 11:
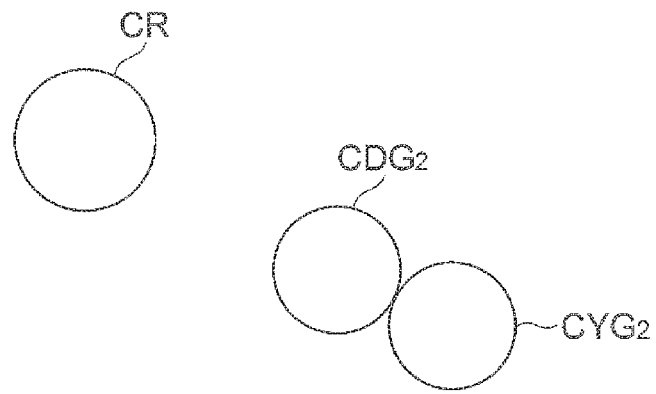

Several variations of processing by the estimation unit 12 are described hereinafter. For example, when the candidate color names "red", "dark green" and "yellow green" are extracted by the extraction unit 11, the estimation unit 12 acquires the color ranges of the candidate color names "red", "dark green" and "yellow green" from the color information storage unit 22. FIG. 11(a) is a view schematically showing the color ranges of candidate color names "red" "dark green" and "yellow green" in a two-dimensional space. As shown in FIG. 11(a), the color range CR of red is distant from the color range CDG1 of dark green and the color range CYG1, of yellow green, and the pixel values indicating "dark green" and "yellow green" are close to each other, and therefore the color range CDG1 of dark green and the color range CYG1 of yellow green overlap.

In this case, the estimation unit can set the color ranges of the respective candidate color names so that they do not overlap based on the pixel values set to the candidate color names. To be specific, the estimation unit 12 acquires the median values of the color ranges of "dark green" and "yellow green" from the color information storage unit 22 and sets a half of the distance between the median Values as the radius of the color ranges, for example. FIG. 11(b) is a view schematically showing the color ranges of "red" "dark green" and "yellow green" that are set not to overlap in a two-dimensional space. As shown in FIG. 11(b), the color range CDG2 of dark green and the color range CYG2 of yellow green no longer overlap. By setting the color ranges in this manner, the color ranges are set to the respective candidate color names without overlap, and therefore, even when a plurality of extracted candidate color names have pixel values close to each other, it is possible to appropriately calculate the number of pixels for each of the candidate color names.

Variations of the calculation of the number of pixels by the estimation unit 12 are described hereinafter, in a product image, a region of pixels having a color corresponding to the color name of a product occupies a certain range. In light of this, the estimation unit 12 may cluster the pixels of a product image based on pixel values, and when the median value of a clustered group is included in the color range of a candidate color name, calculate the number of pixels for each candidate color name by assuming that the number of pixels included in the group is the number of pixels included in the color range of the candidate color name. In such calculation of the number of pixels, candidate color names are associated with each group of pixels clustered by pixel values, and thereby candidate color names are associated for each region of the same color, and the number of pixels is calculated. It is thereby possible to efficiently perform the accurate estimation of a color name.

As described earlier, the color estimation device 1 may be integrated with the electronic, commerce server 3 that runs an electronic commerce site (see FIG. 1). In such a case, the color estimation device 1 may farther include a search unit 31 that refers to the product information storage unit 21 in response to a search request from a user that contains the designation of the color name of a product and then sends a search result that contains a product image with which the designated color name is associated back to the user.

Specifically, when a search request for a product that contains the designation of the color name (for example, "green") of a product is received from a terminal device (not shown) of a user through a network, the search unit 31 refers to the product information storage unit 21 shown in FIG. 10 and sends information about the product with the product ID (M2) containing the product image P2 with which the color name "green" is associated as a search result to the initial device of the user.

Further, when a search request that contains the color name "red" which is different from the color name "blue" that is associated with the representative image of the product ID (M3) together with the keyword "shirt" which the product with the product ID (M3) corresponds to is received (see FIG. 10), the search unit 31 may send a search result that contains the product image P32 with which the designated color name "red" is associated as the representative image to the user. Specifically, with reference to FIG. 6, the search unit 31 sends the product page that displays the product image P32, instead of the product image P31, as the representative image to the user's terminal device. By such processing, in response to a search request for a product with the designation of a color name from a user, even when the image with a different color name from the color name designated by the search request is preset as the representative image of the product, it is possible to provide the product image with the color name designated by the search request to the user.

Figure 12:
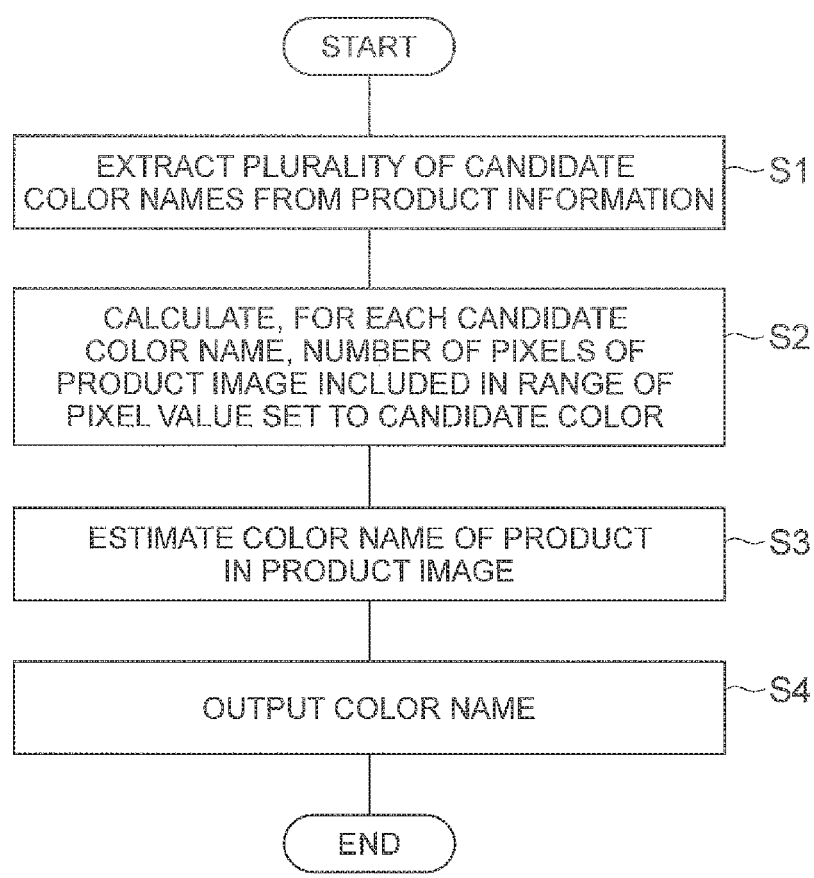
FIG. 12 is a flowchart showing an example of a process of a color estimation method in the color estimation device.

A color estimation method according to this embodiment is described hereinafter with reference to FIG. 12. FIG. 12 is a flowchart showing an example of a process of the color estimation method in the color estimation device 1.

First, the extraction unit 11 extracts, from product information associated with a product image, a plurality of color text information indicating color names as candidate color names of the product (S1).

Next, the estimation unit 12 estimates the color name of the product shown in the product image from the candidate color names based on the pixel value set on the basis of the candidate color names extracted by the extraction unit 11 in Step S1 and the pixel value of the pixels contained in the product image.

To be specific, the estimation unit 12 calculates the number of pixels of the product image included in the color range set to each candidate color name (S2). The estimation unit 12 then estimates the candidate color name with the largest number of pixels as the color name of the product shown in the product image (S3). Then, the output unit 13 outputs the color name estimated by the estimation unit 1 (S4).

Figure 13:
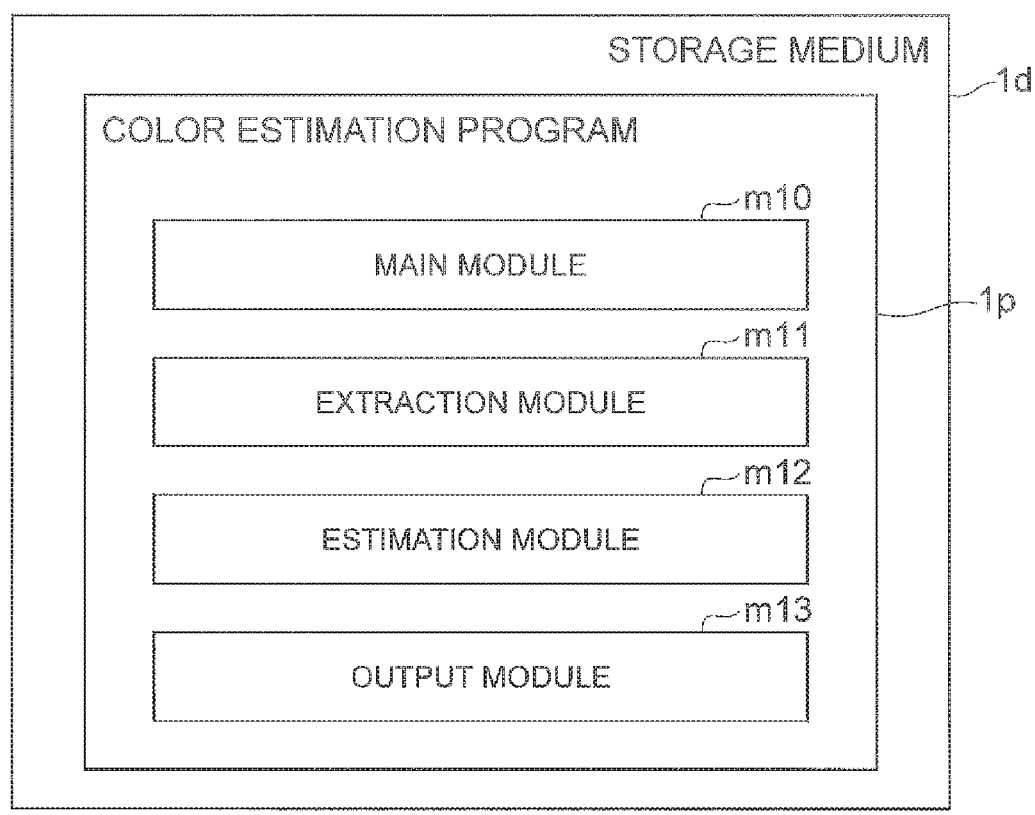
FIG. 13 is a view showing a configuration of a color estimation program.

A color estimation program that causes a computer to function as the color estimation device 1 is described hereinafter with reference to FIG. 13. A color estimation program 1p includes a main module m10, an extraction module m11, an estimation module m12, and an output module m13. The color estimation program 1p may further include a search module (not shown).

The main module m10 is a part that exercises control over the color estimation processing. The functions implemented by executing the extraction module m11, the estimation module m12, the output module m13 and the search module are respectively the same as the functions of the extraction unit 11, the estimation unit 12, the output unit 13 of the color estimation device 1 shown in FIG. 1 and the search unit 31.

The color estimation program 1p is provided through a storage medium 1d such as CD-ROM or DVD-ROM or semiconductor memory, for example. Further, the color estimation program 1p may be provided as a computer data signal superimposed onto a carrier wave over a communication network.

According to the color estimation device 1, the color estimation method and the color estimation program 1p described above, candidate color names are extracted from product information containing text indicating the color of a product shown in a product image, and the color name of the product is estimated among the candidate color names based on the pixel value and the number of pixels included in the product image, and it is thus possible to prevent an incorrect color name from being estimated as the color name of the product and thereby achieve the accurate estimation of the color name.

Another example of the estimation of a color name by the estimation unit 12 is described hereinafter with reference to FIGS. 14 and 15. The following example is especially effective in the case where a plurality of product images are associated with one product, and the same number of candidate color names as the number of product images are extracted from product information.

FIG. 14(a) is a view showing an example of data stored in the product information storage unit 21. In the example shown in FIG. 14(a), product information T4 and product images P41, P42 and P43 are stored in association with a product ID (M4). The product information T4 contains text information "You can select from three colors: dark brown, dark blue and black" to be presented to users. The extraction unit 11 extracts the candidate color names "dark brown", "dark blue" and "black" from the product information T4.

In the case where a plurality of product images are associated with one product as in the product with the product ID (M4), the estimation unit 12 calculates, for each of the plurality of product images, the number of pixels of the product image that are included in the color range which is set to one candidate color name among a plurality of candidate color names, and estimates the color name of the product image with the largest number of pixels as one candidate color name.

To be specific, the estimation unit 12 calculates the number of pixels of the product image that are included in the color range which is set to one candidate color name "dark brown" for each of the product images P41, P42 and P43. Likewise, the estimation unit 12 calculates the number of pixels of the product image that are included in the color range which is set to one candidate color name "dark blue" for each of the product images P41, P42 and P43, and calculates the number of pixels of the product image that are included in the color range which is set to one candidate color name "black" for each of the product images P41, P42 and P43.

FIG. 15 is a view showing an example of the number of pixels of each of the product. Images P41, P42 and P43 that are included in the color range, which is calculated for each of the candidate color names "dark brown", "dark blue" and "black".

As shown in FIG. 15, the numbers of pixels of the product images P41, P42 and P43 that are included in the color range of the candidate color name "dark brown", for example, are 200, 180 and 175, respectively. Thus, the product image that contains the largest number of pixels included in the color range of the candidate color name "dark brown" is the product image P41, and therefore the estimation unit 12 estimates the color name of the product shown in the product image P41 as "dark brown".

Further, the numbers of pixels of the product images P41, P42 and P43 that are included in the color range of the candidate color name "dark blue" are 130, 200 and 140, respectively, Thus, the product image that contains the largest number of pixels included in the color range of the candidate color name "dark blue" is the product image P42, and therefore the estimation unit 12 estimates the color name of the product shown in the product image P42 as "dark blue".

Further, the numbers of pixels of the product images P41, P42 and P43 that are included in the color range of the candidate color name "black" are 90, 80 and 130, respectively, Thus, the product image that contains the largest number of pixels included in the color range of the candidate color name "black" is the product image P43, and therefore the estimation unit 12 estimates the color name of the product shown in the product image P43 as "black".

Then, as shown in FIG. 14(b), the output unit 13 stores the estimated color names "dark brown", "dark blue" and "black" in association with the product images P41, P42 and P43 in the product information storage unit 21, respectively.

In the example shown in FIG. 15, when the color names are estimated by the processing of calculating the number of pixels included in the color range of each candidate color name for each of the product images, because the number of pixels included in dark brown is the largest among the pixels contained in the product image P43, the color name of the product image P43 is incorrectly estimated as "dark brown". However, in the example of the processing described above, because, for one candidate color name, the number of pixels of the pixel value corresponding to that color name in each product image is calculated, and one candidate color name is estimated as the color name of the product image with the largest number of pixels, even when a plurality of extracted candidate color names have pixel values closer to each other, it is possible to accurately estimate the color name.

Yet another example of the estimation of a color name by the estimation unit 12 is described hereinafter with reference to FIGS. 16, 17 and 18. FIG. 16(a) is a view showing an example of data stored in the product information storage unit 21. In the example shown in FIG. 16(a), product information T5 and product images P51 and P52 are stored in association with a product ID (M5). The product information T5 contains text information "Black and dark blue are available" to be presented to users. The extraction unit 11 extracts the candidate color names "black" and "dark blue" from the product information T5.

First, the estimation unit 12 calculates the number of pixels of the product image P51 that are included in the color range which is set to each candidate color name. FIG. 17(a) is a view showing a calculation result of the number of pixels included in the color range of each of the candidate color names "black" and "dark blue" for the product image P51. The estimation unit 12 estimates "black" with the largest number of pixels as the color name of the product shown in the product image P51.

Likewise, the estimation unit 12 calculates the number of pixels of the product image P52 that are included in the color range which is set to each candidate color name. FIG. 17(b) is a view showing a calculation result of the number of pixels included in the color range of each of the candidate color names "black" and "dark blue" for the product image P52. The estimation unit 12 estimates "black" with the largest number of pixels as the color name of the product shown in the product image P52.

Then, as shown in FIG. 16(b), the output unit 13 outputs the color name "black" estimated for the product image P51 and the color name "black" estimated for the product image P52 in association with the product images P51 and P52 in the product information storage unit 21, respectively. As shown in FIG. 16(b), because the candidate color name "dark blue" is not estimated as the color name of the product in any product image regardless of the fact that the plurality of candidate color names "black" and "dark blue" have been extracted as the candidate color names by the extraction unit 11, it is likely that there is an error in the estimation of a color name. In such a case, the estimation unit 12 calculates, for each of the plurality of product images, the number of pixels of the product image that are included in the color range which is set to one candidate color name among the plurality of candidate color names, and estimates the color name of the product image with the largest number of pixels as one candidate color name, just like the example that is described with reference to FIGS. 14 and 15.

To be specific, the estimation unit 12 calculates the number of pixels of the product image that are included in the color range which is set to the candidate color name "black" for each of the product images P51 and P52. Likewise, the estimation unit 12 calculates the number of pixels of the product image that are included in the color range Which is set to the candidate color name "dark blue" for each of the product images P51 and P52. FIG. 17(c) is a view showing an example of the number of pixels of each of the product images P51 and P52 that are included in the color range, which is calculated for each of the candidate color names "black" and "dark blue".

As shown in FIG. 17(c), the numbers of pixels of the product images P51 and P52 that are included in the color range of the candidate color name "black" are 150 and 140, respectively. Thus, the product image that contains the largest number of pixels included in the color range of the candidate color name "black" is the product image P51, and therefore the estimation unit 12 estimates the color name of the product shown in the product image P51 as "black". Further, the numbers of pixels of the product images P51 and P52 that are included in the color range of the candidate color name "dark blue" are 100 and 120, respectively. Thus, the product image that contains the largest number of pixels included in the color range of the candidate color name "dark blue" is the product image P52, and therefore the estimation unit 12 estimates the color name of the product shown in the product image P52 as "dark blue". Then, as shown in FIG. 16(c), the output unit 13 stores the estimated color names "black" and "dark blue" in association with the product images P51 and P52 in the product information storage unit 21, respectively.

FIG. 18 is a flowchart showing yet another example of a color name estimation process by the estimation unit 12. First, the extraction unit 11 extracts, from product information associated with a product image, a plurality of color text information indicating color names as candidate color names of the product (S11).

Next, the estimation unit 12 calculates the number of pixels of one product image that are included in the color range which is set to each candidate color name (S12). The estimation unit 12 then estimates the candidate color name with the largest number of pixels as the color name of the product shown in one product image (S13).

After that, the estimation unit 12 determines whether there is a candidate color name that is not estimated as the color name of the product in any product image among the plurality of candidate color names (S14). When it is determined that there is a candidate color name that is not estimated as the color name of the product in any product image, the process proceeds to Step S15. On the other hand, when it is not determined that there is a candidate color name that is not estimated as the color name of the product in any product image, the process proceeds to Step S17.

In Step S15, the estimation unit 12 calculates, for each of the plurality of product images, the number of pixels of the product image that are included in the color range which is set to one candidate color name among the plurality of candidate color names (S15). Then, the estimation unit 12 estimates the color name of the product image with the largest number of pixels as one candidate color name (S16). The output unit 13 outputs the estimated color name (S17).

As described above, in the estimation of a color name, the candidate color name with the largest number of pixels included in the color range set to each candidate color name is estimated as the color name of the product shown in one product image, and when there is a color name that is not estimated as a product color name as a result of estimating the color names of all product images, the number of pixels of the pixel value corresponding to the color name of each product image is calculated for one candidate color name, and one candidate color name is estimated as the color name of the product image with the largest number of pixels. Thus, in the case where a plurality of candidate color names are associated with a plurality of product images of one product, it is possible to accurately estimate the color name of the product even when the plurality of candidate color names have pixel values close to each other.

An embodiment of the present invention is described in detail above. However, the present invention is not limited to the above-described embodiment. Various changes and modifications may be made to the present invention without departing from the scope of the invention.

REFERENCE SIGNS LIST

1 . . . color estimation device, 3 . . . electronic commerce server, 11 . . . extraction unit, 12 . . . estimation unit, 13 . . . output unit, 21 . . . product information storage unit, 22 . . . color information storage unit, 31 . . . search unit, 1$d$ . . . storage medium, 1$p$ . . . color estimation program, m10 . . . main module, m11 . . . extraction module, m12 . . . estimation module, m13 . . . output module

The invention claimed is:

1. A color estimation device comprising:
at least one memory configured to store computer program code;
at least one processor configured to read said computer program code and operate as instructed by said computer program code, said computer program code including:
extraction code configured to cause at least one of said at least one processor to extract, from text information contained in product information associated with a product image showing a product, a plurality of color text information indicating color names as candidate color names for the product;
estimation code configured to cause at least one of said at least one processor to estimate a color of the product shown in the product image among the candidate color names extracted based on a pixel value set to each of the candidate color names and a pixel value of a pixel included in the product image; and
output code configured to cause at least one of said at least one processor to output the color estimated, and
wherein the estimation code causes at least one of said at least one processor to calculate, for each of the candidate color names, the number of pixels of the product image included in a color range, the color range being a range of the pixel value set to each of the candidate color names, and estimate a candidate color name with the largest number of pixels as the color of the product shown in the product image, and
wherein the estimation code causes at least one of said at least one processor to set color ranges of the candidate color names not to overlap with each other based on the pixel value set to each of the candidate color names.

2. The color estimation device according to claim 1, wherein the estimation code causes at least one of said at least one processor to assign higher weights to a second pixel located at a position closer to a center of the product image than a first pixel included in the product image, and calculate the number of pixels for each of the candidate color names.

3. The color estimation device according to claim 1, wherein the estimation code causes at least one of said at least one processor to cluster pixels of the product image based on pixel values, and when a median value of a group is included in the color range of the candidate color name, calculate the number of pixels for each of the candidate color names, assuming the number of pixels included in the group as the number of pixels included in the color range of the candidate color name.

4. The color estimation device according to claim 1, wherein the estimation code causes at least one of said at least one processor to estimate the candidate color name where the calculated number of pixels is the largest and the candidate color name where a difference in the calculated number of pixels from that candidate color name is equal to or less than a specified number respectively as colors of a plurality of products shown in the product image.

5. The color estimation device according to claim 1, wherein, when a plurality of product images are associated with one product, the estimation code causes at least one of said at least one processor to estimate a color for each of the plurality of product images.

6. The color estimation device according to claim 1, wherein, when a plurality of product images are associated with one product, the estimation code causes at least one of said at least one processor to calculate, for each of the plurality of product images, the number of pixels of each of the plurality of product images included in the color range, the color range being the range of the pixel value set to one candidate color name among the plurality of candidate color names, and estimate a color of the product image with the largest number of pixels to be the one candidate color name.

7. The color estimation device according to claim 1, wherein
when a plurality of product images are associated with one product, the estimation code causes at least one of said at least one processor to calculate, for each of the candidate color names, the number of pixels of one product image included in the color range, the color range being the range of the pixel value set to the candidate color name, and estimate the candidate color name with the largest number of pixels as the color of the product shown in the one product image, and
when there is a candidate color name not estimated as the color of the product in any product image among the plurality of candidate color names, the estimation code causes at least one of said at least one processor to calculate, for each of the plurality of product images, the number of pixels of the product image included in the range of the pixel value set to one candidate color name among the plurality of candidate color names, and estimate the color of the product image with the largest number of pixels to be the one candidate color name.

8. The color estimation device according to claim 1, wherein, when the product information contains fields for receiving designation of the color of the product from the user, the extraction code causes at least one of said at least one processor to extract the color text information from the fields as the candidate color names.

9. The color estimation device according to claim 1, wherein the output code causes at least one of said at least one processor to store the estimated color in association with the product image into a product information storage that stores the product information and the product image in association with each other.

10. The color estimation device according to claim 9, further comprising:
search code configured to cause at least one of said at least one processor to refer to the product information storage in response to a search request containing designation of the color of the product from the user, and send a search result containing the product image with which the designated color is associated, back to the user.

11. The color estimation device according to claim 10, wherein, in a case where a plurality of product images are associated with one product, and one product image among the plurality of product images is set as a representative image for showing the product in a product page to present the product in the product information storage, when the search request containing designation of a color different from a color associated with the representative image is received from the user, the search code causes at least one of said at least one processor to send the search result containing the product image in which the designated color is associated with the representative image, back to the user.

12. A color estimation method performed by a computer, comprising:
extracting, from text information contained in product information associated with a product image showing a product, a plurality of color text information indicating color names as candidate color names for the product;
estimating a color of the product shown in the product image among the candidate color names extracted based on a pixel value set to each of the candidate color names and a pixel value of a pixel included in the product image; and
outputting the color estimated, and
wherein the estimating further comprises:
calculating, for each of the candidate color names, the number of pixels of the product image included in a color range, the color range being a range of the pixel value set to each of the candidate color names, and estimating a candidate color name with the largest number of pixels as the color of the product shown in the product image, and
setting color ranges of the candidate color names not to overlap with each other based on the pixel value set to each of the candidate color names.

13. A non-transitory computer-readable recording medium storing a color estimation program causing a computer to:
extract, from text information contained in product information associated with a product image showing a product, a plurality of color text information indicating color names as candidate color names for the product;
estimate a color of the product shown in the product image among the candidate color names extracted based on a pixel value set to each of the candidate color names and a pixel value of a pixel included in the product image; and
output the color estimated, and
wherein the estimating further comprises:
calculate, for each of the candidate color names, the number of pixels of the product image included in a color range, the color range being a range of the pixel value set to each of the candidate color names, and estimate a candidate color name with the largest number of pixels as the color of the product shown in the product image, and set color ranges of the candidate color names not to overlap with each other based on the pixel value set to each of the candidate color names.

\* \* \* \* \*